(12) United States Patent
Takeuchi et al.

(10) Patent No.: US 8,685,249 B2
(45) Date of Patent: Apr. 1, 2014

(54) MULTI-STAGE SEAWATER DESALINATION APPARATUS AND OPERATION CONTROL METHOD OF MULTI-STAGE SEAWATER DESALINATION APPARATUS

(75) Inventors: Kazuhisa Takeuchi, Nagasaki-ken (JP); Yoshiaki Ito, Ngasaki-ken (JP); Kenji Tanaka, Nagasaki-ken (JP); Hideo Iwahashi, Nagasaki-ken (JP); Katsunori Matsui, Nagasaki-ken (JP); Takayoshi Hori, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 226 days.

(21) Appl. No.: 13/131,769

(22) PCT Filed: Aug. 7, 2009

(86) PCT No.: PCT/JP2009/064058
§ 371 (c)(1),
(2), (4) Date: May 27, 2011

(87) PCT Pub. No.: WO2010/061666
PCT Pub. Date: Jun. 3, 2010

(65) Prior Publication Data
US 2011/0240554 A1    Oct. 6, 2011

(30) Foreign Application Priority Data

Nov. 27, 2008  (JP) ................................. 2008-303218

(51) Int. Cl.
*B01D 65/06*    (2006.01)
*B01D 61/12*    (2006.01)
*C02F 1/76*     (2006.01)
*C02F 1/70*     (2006.01)
*B01D 61/58*    (2006.01)

(52) U.S. Cl.
USPC ........... 210/636; 210/652; 210/754; 210/743; 210/739

(58) Field of Classification Search
None
See application file for complete search history.

(56) References Cited

U.S. PATENT DOCUMENTS 4,808,287 A    2/1989  Hark
4,988,444 A *  1/1991  Applegate et al. ............ 210/636

(Continued)

FOREIGN PATENT DOCUMENTS

JP    10-128325 A    5/1998
JP    11-333258 A    12/1999

(Continued)

OTHER PUBLICATIONS

Extended European Search Report dated Mar. 26, 2013, issued in corresponding European Patent Application No. 09828916.8 (5 pages).

(Continued)

*Primary Examiner* — Katherine Zalasky
(74) *Attorney, Agent, or Firm* — Westerman, Hattori, Daniels & Adrian, LLP

(57) ABSTRACT

A high-pressure pump $P_1$ that increases the pressure of raw water, a high-pressure reverse osmosis device including a high-pressure reverse osmosis membrane for concentrating a salt content in high-pressure feed water, a first drain valve mounted on a permeated water line for supplying the permeated water downstream and temporarily draining permeated water of an initial start-up from a discharge line, a low-pressure pump that is mounted on a permeated water line provided downstream of the first drain valve and reduces the pressure of the permeated water, a low-pressure reverse osmosis device including a low-pressure reverse osmosis membrane for concentrating a salt content in low-pressure feed water, and a second drain valve mounted on a discharge line at the concentrated water side of the low-pressure reverse osmosis device that temporarily discharges the low-pressure feed water of the initial start-up supplied to the low-pressure reverse osmosis device.

4 Claims, 13 Drawing Sheets

(56) References Cited

U.S. PATENT DOCUMENTS

| | | | |
|---|---|---|---|
| 5,238,574 A * | 8/1993 | Kawashima et al. | 210/652 |
| 2003/0094406 A1 | 5/2003 | Smith | |
| 2008/0105617 A1 | 5/2008 | Oklejas | |

FOREIGN PATENT DOCUMENTS

| | | |
|---|---|---|
| JP | 2000-042544 A | 2/2000 |
| JP | 2002-282855 A | 10/2002 |
| JP | 2003-071252 A | 3/2003 |
| JP | 2004-33800 A | 2/2004 |
| JP | 2006-187719 A | 7/2006 |
| JP | 2007-125493 A | 5/2007 |
| JP | 2008-055317 A | 3/2008 |
| JP | 2008-307487 A | 12/2008 |
| WO | 03/040042 A1 | 5/2003 |
| WO | 2007/130053 A1 | 11/2007 |

OTHER PUBLICATIONS

Decision to Grant a Patent dated Sep. 3, 2013, cited in Japanese Patent Application No. 2008-303218, w/English translation.

"Fukuoka District Waterworks Agency: Mechanism of Seawater Desalination", URL: http://www.f-suiki.or.jp/seawater/facilities/mechanism/php, 8pgs, (2010).

Written Opinion of the ISA for International Application No. PCT/JP2009/064058 dated Oct. 27, 2009 w/partial English translation.

International Search Report of PCT/JP2009/064058, mailing date Oct. 27, 2009.

* cited by examiner

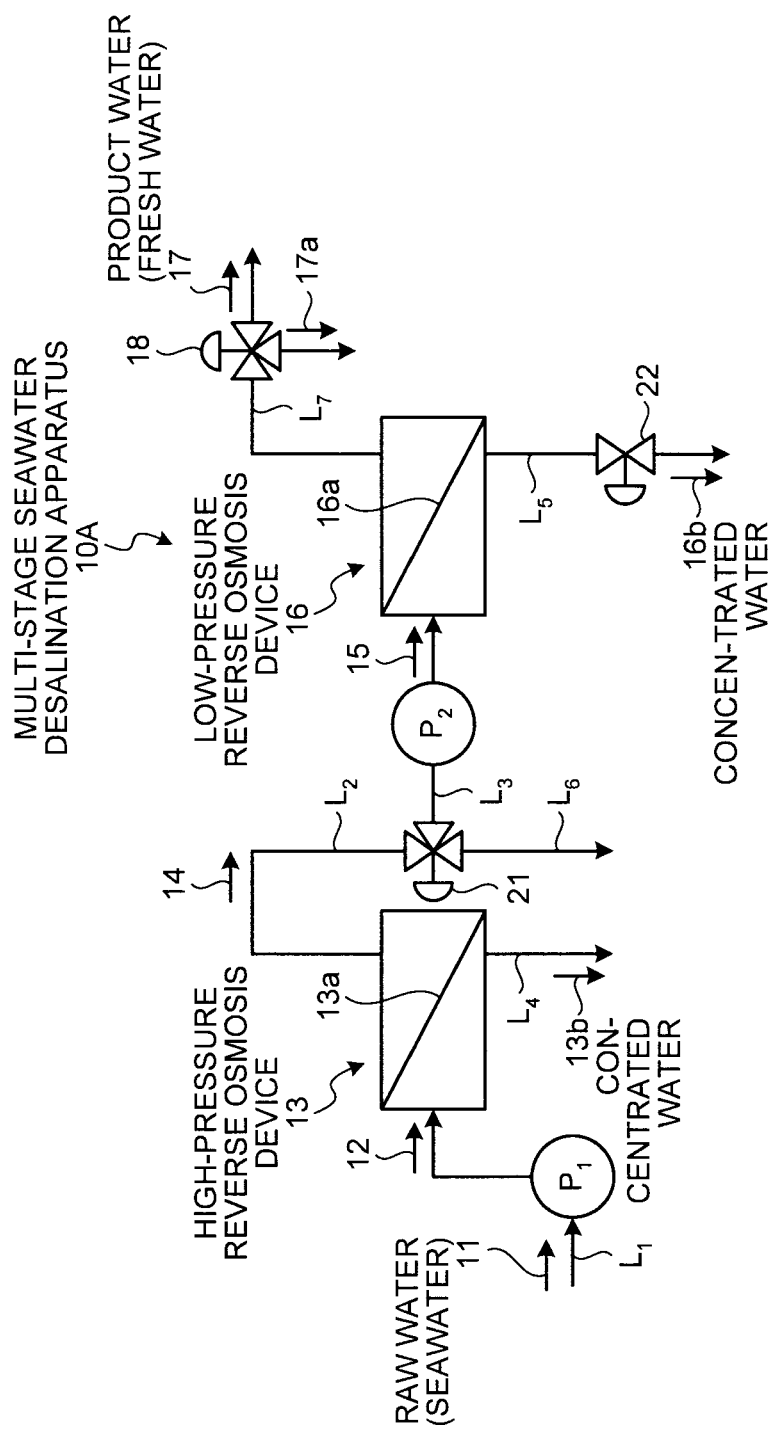

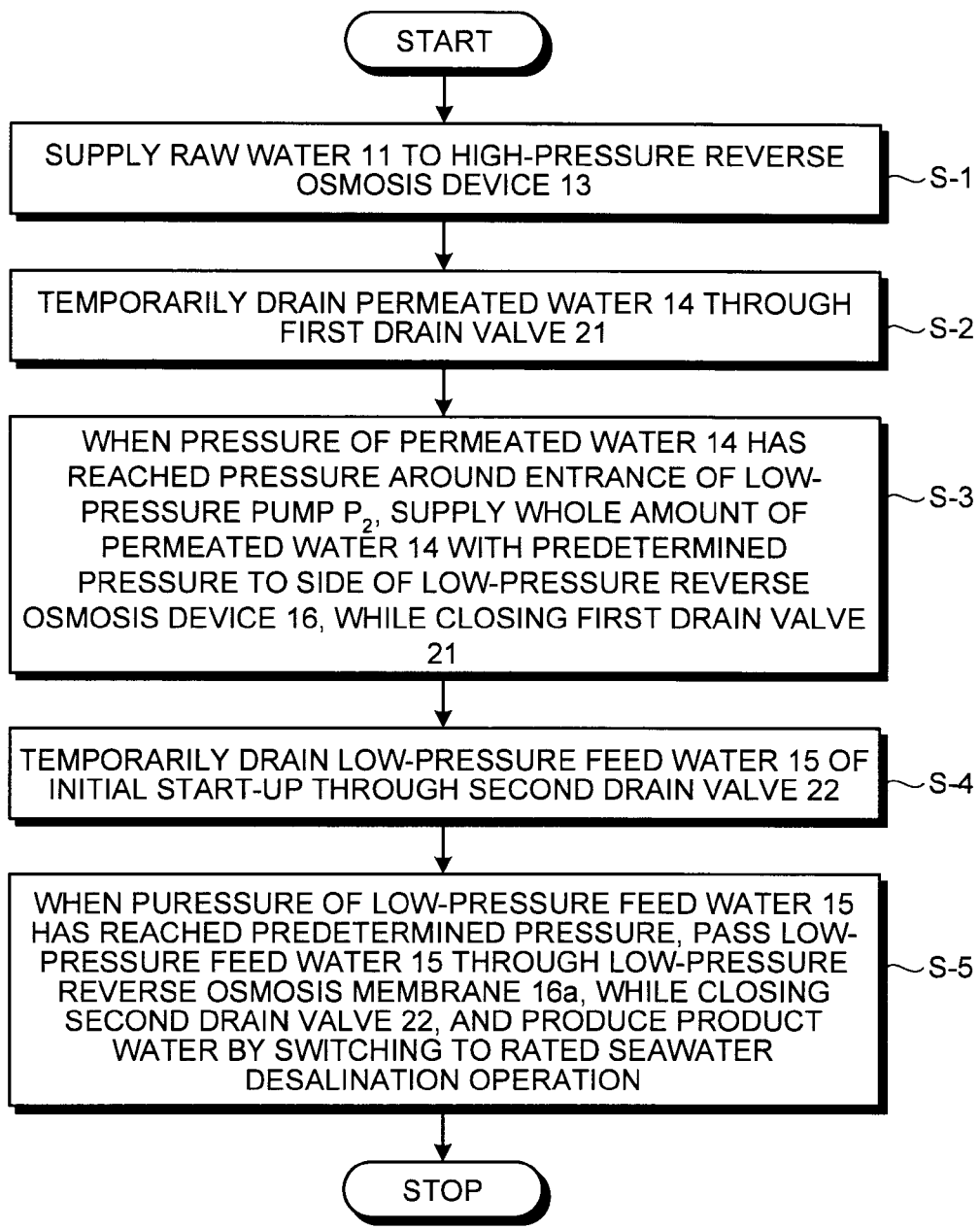

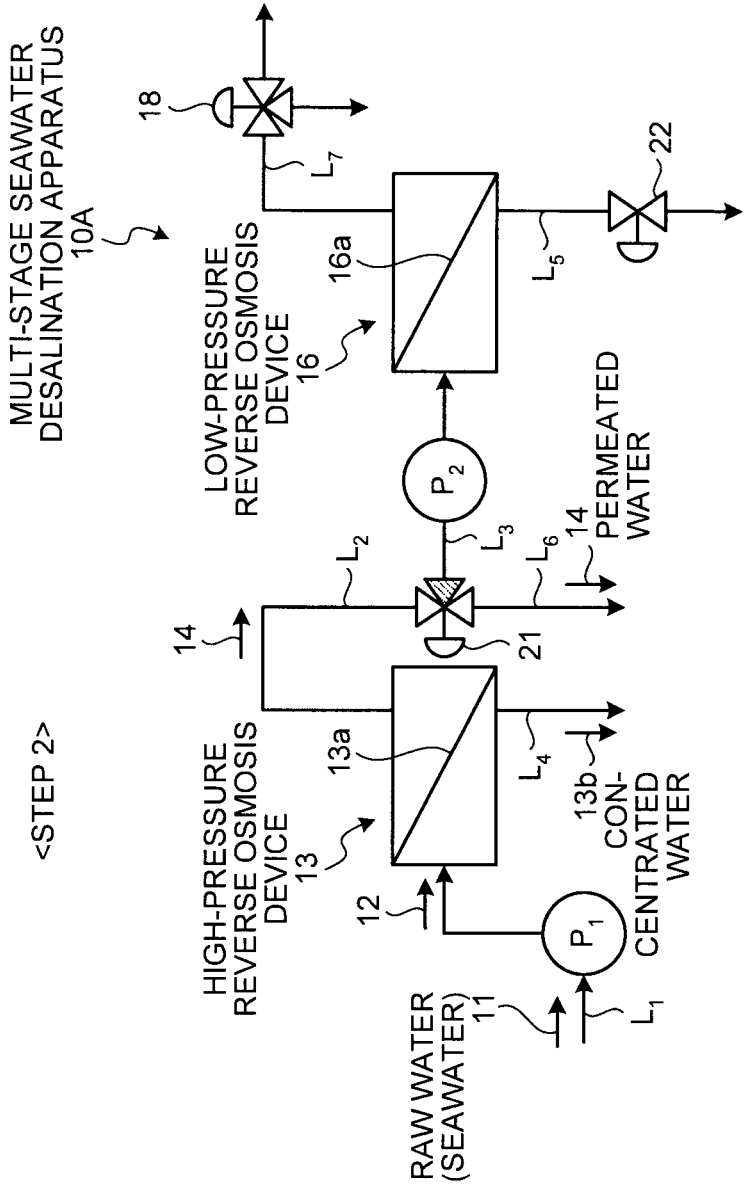

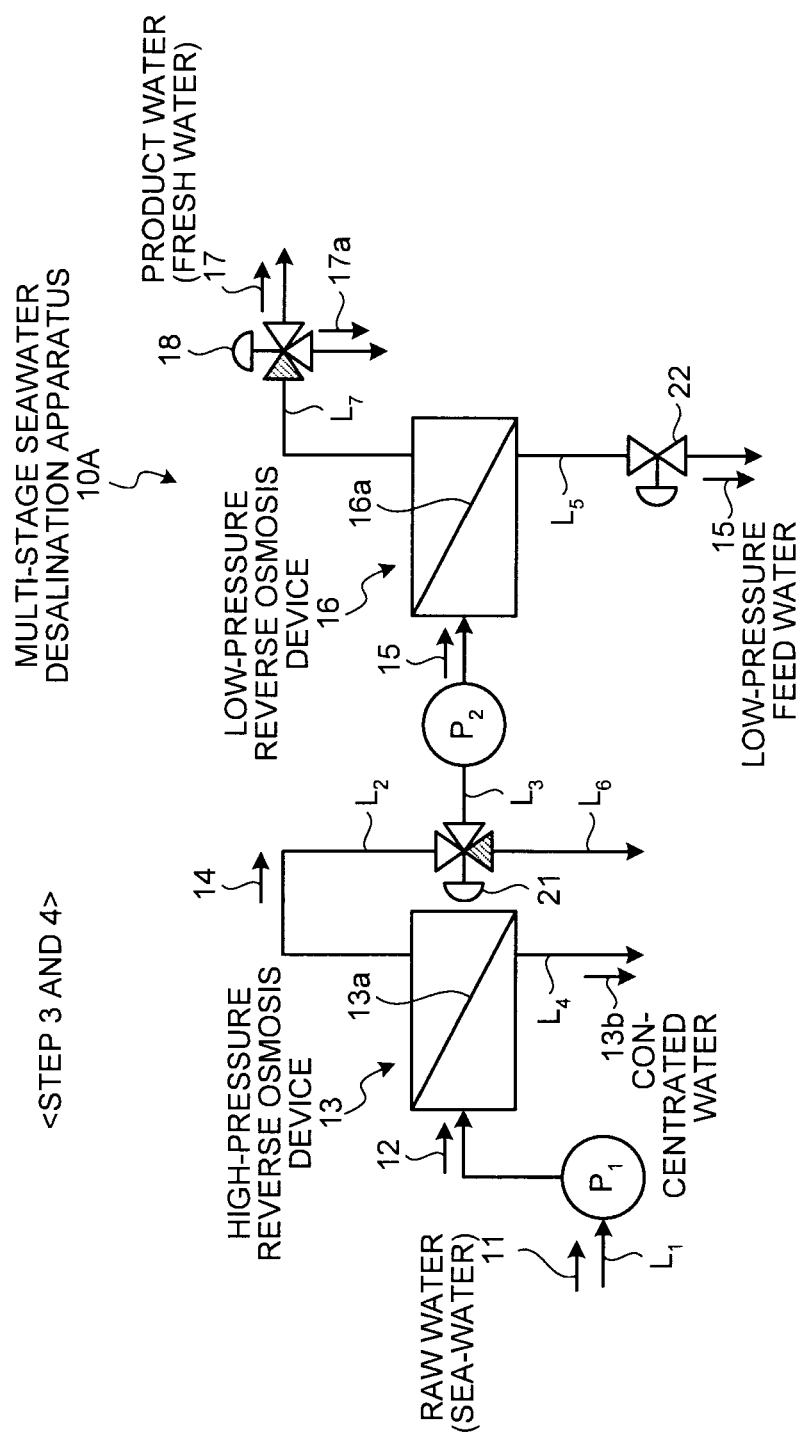

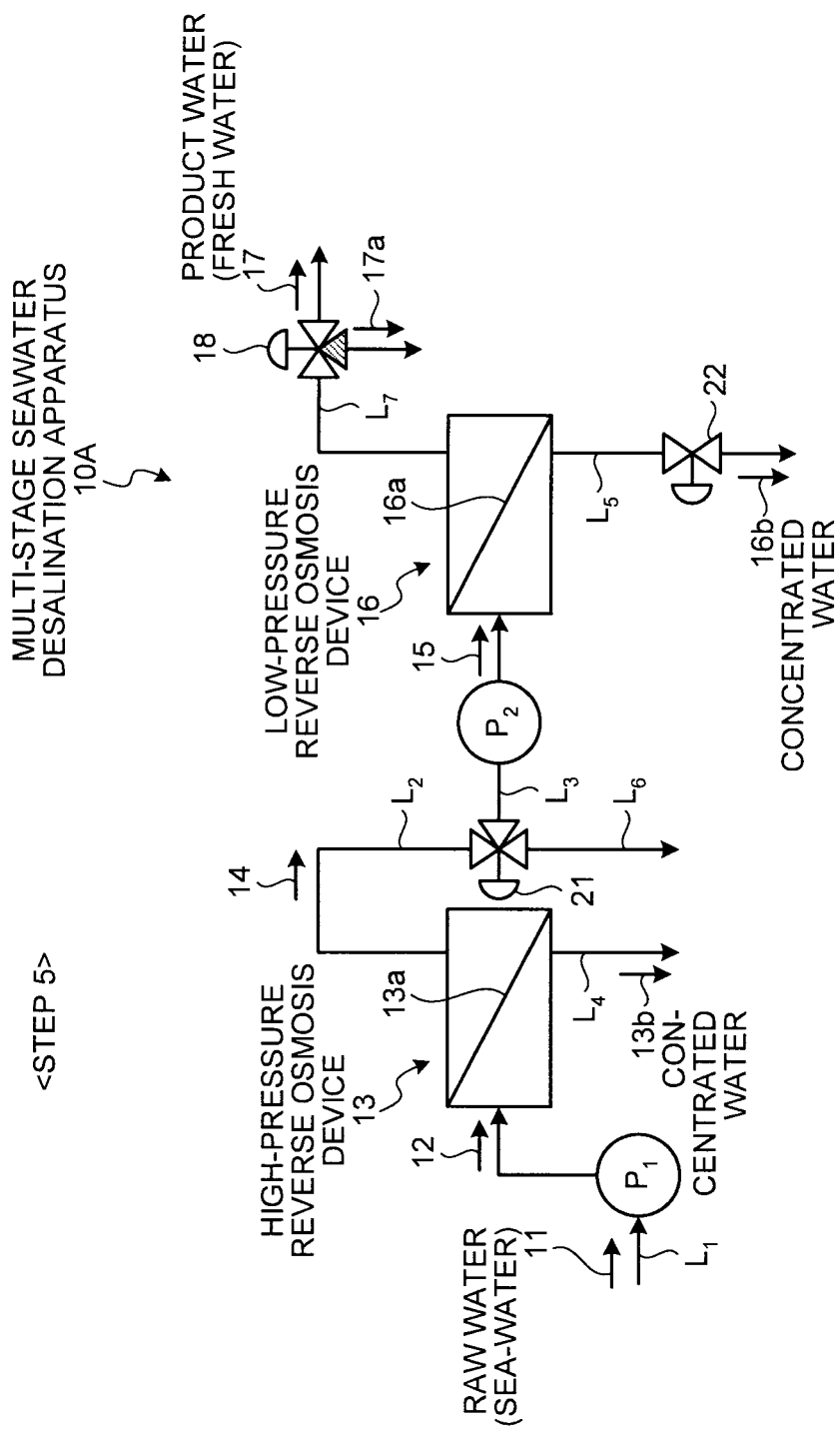

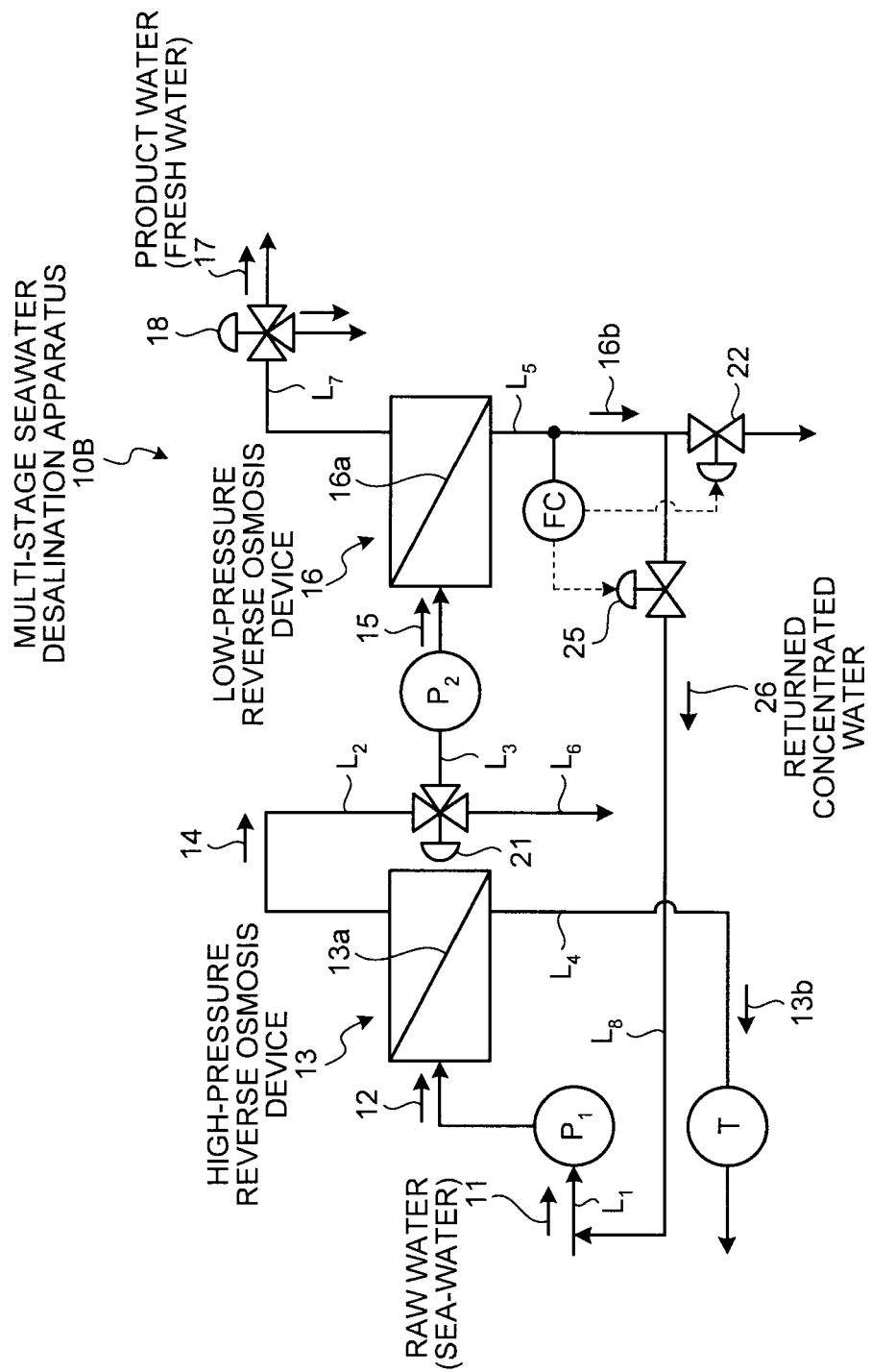

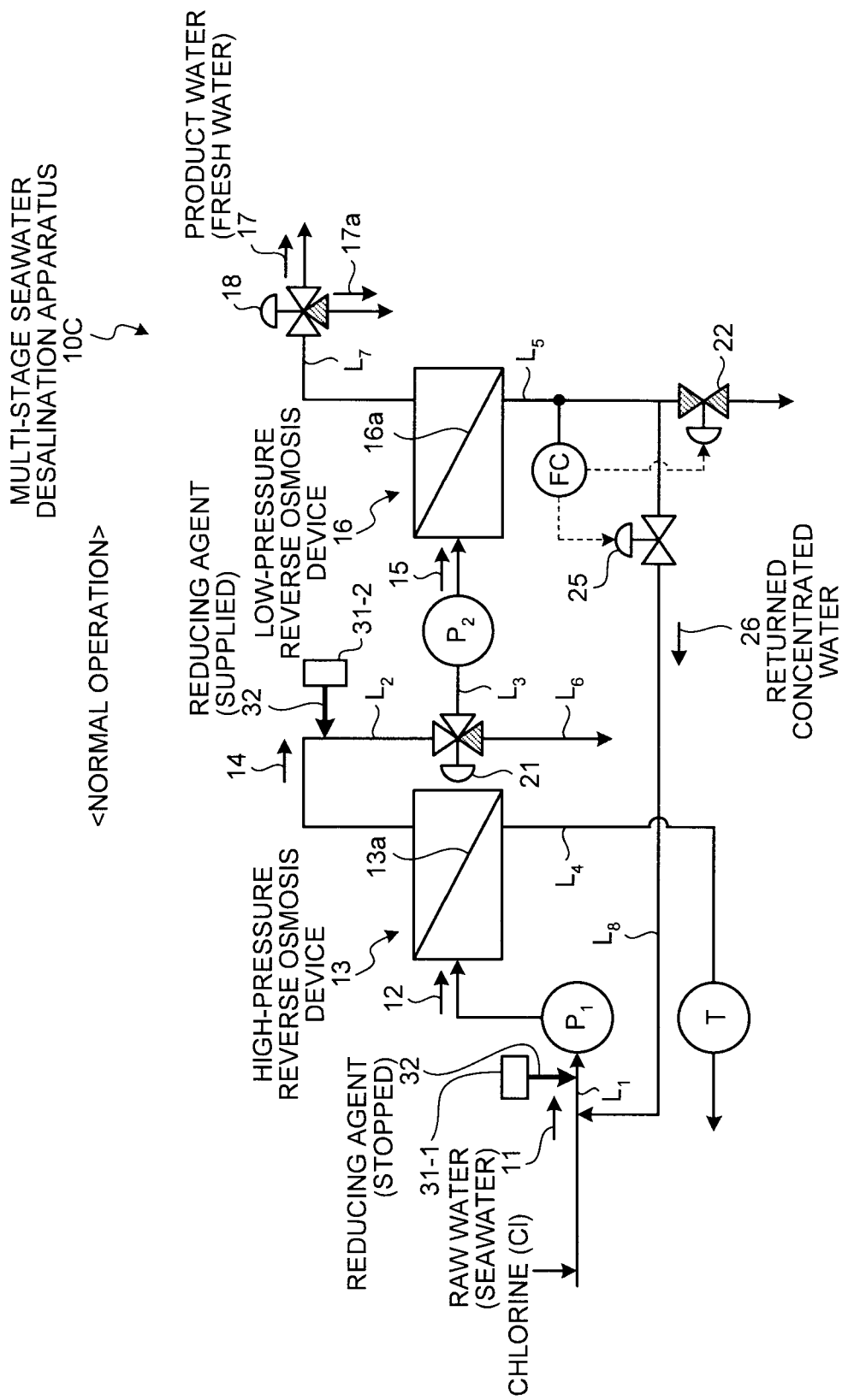

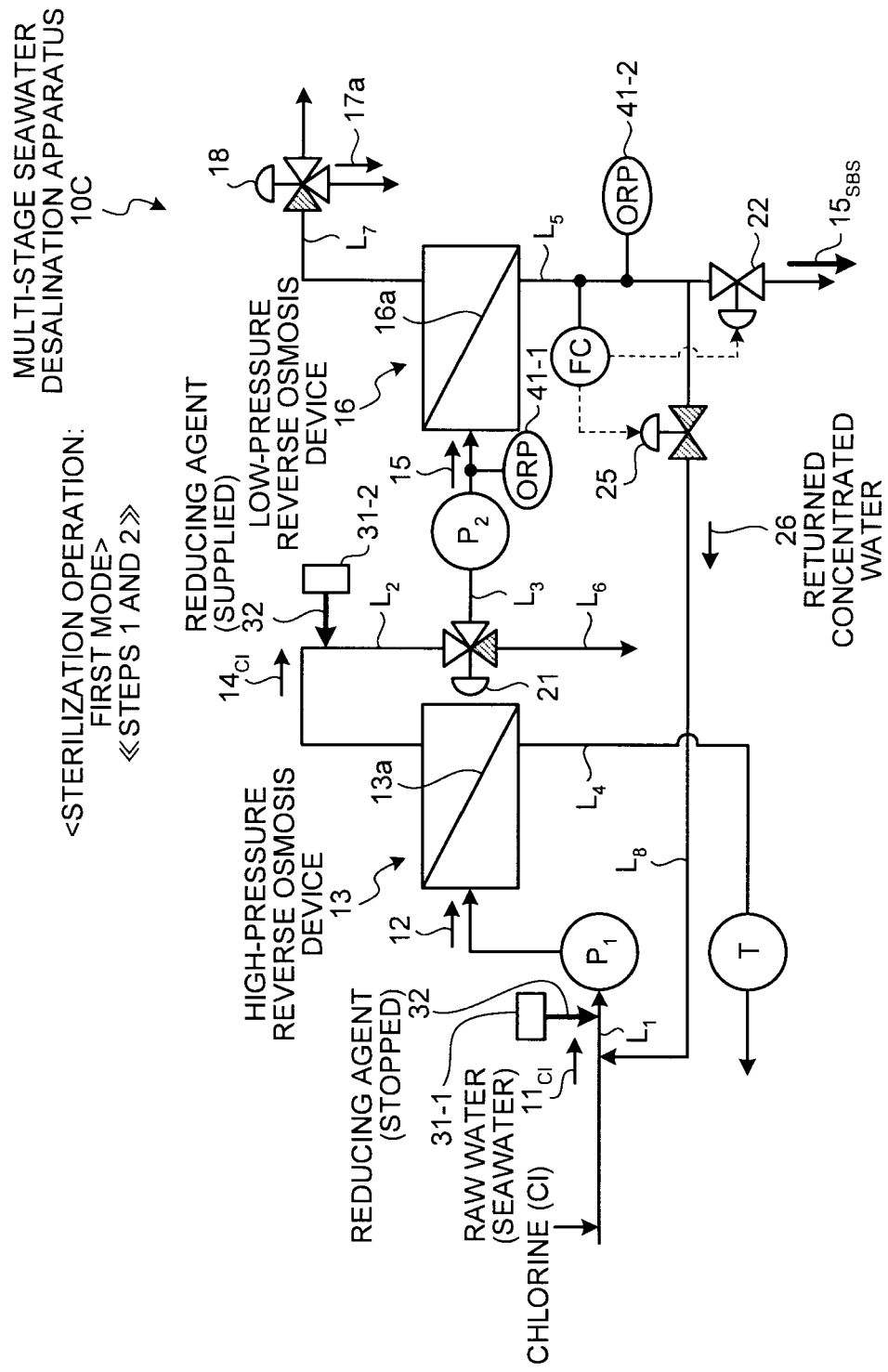

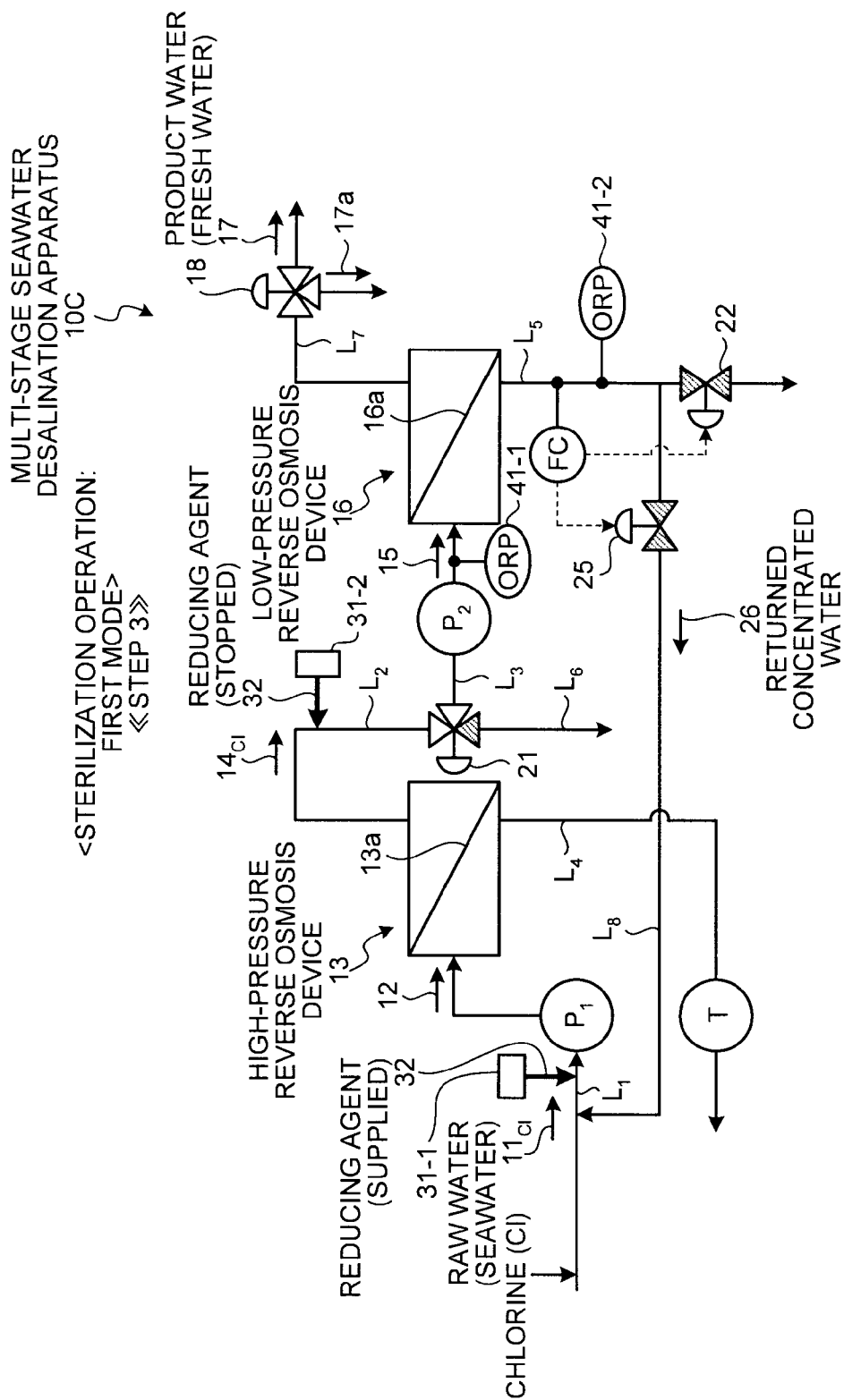

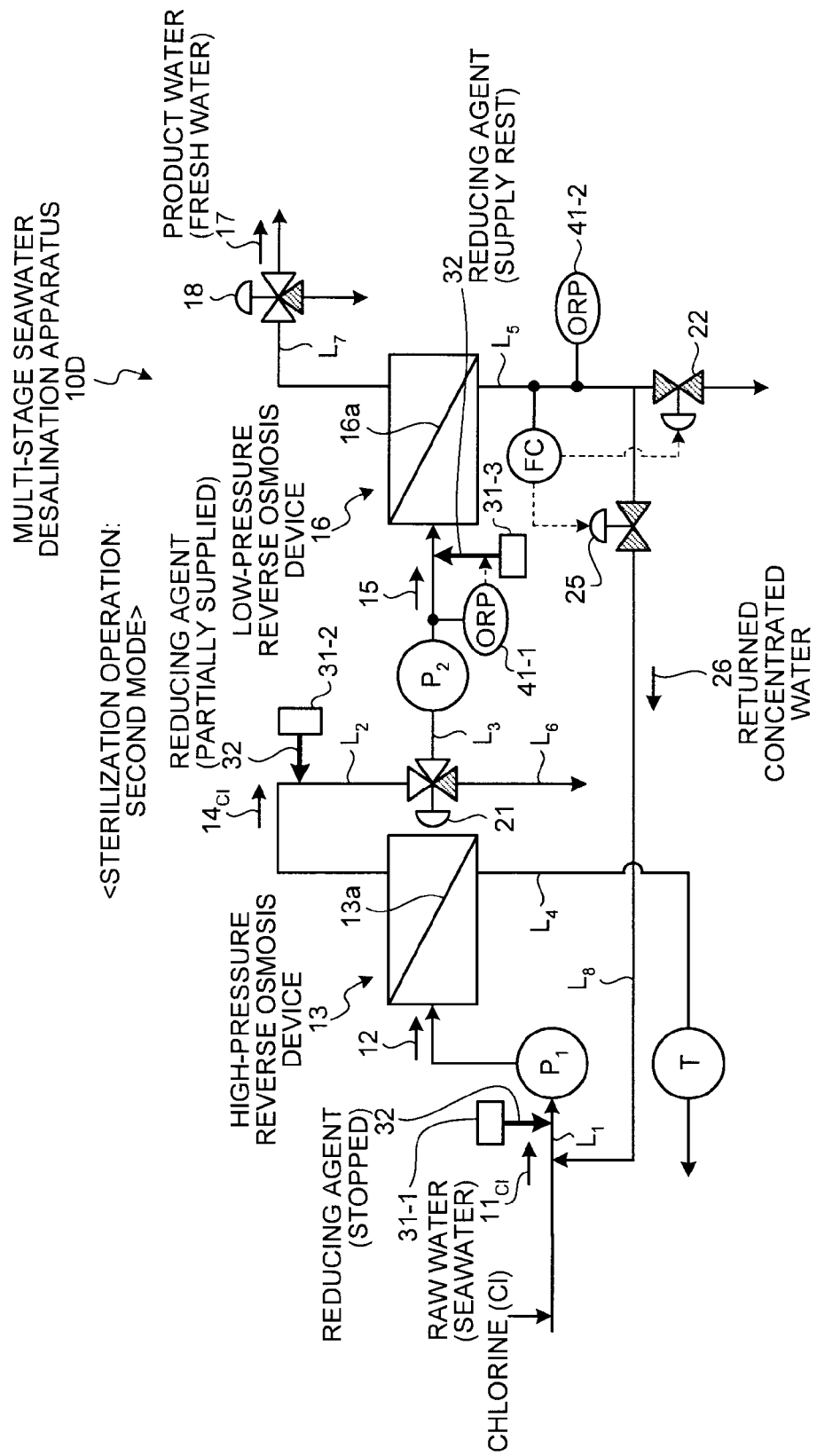

MULTI-STAGE SEAWATER DESALINATION APPARATUS AND OPERATION CONTROL METHOD OF MULTI-STAGE SEAWATER DESALINATION APPARATUS

TECHNICAL FIELD

The present invention relates to a multi-stage seawater desalination apparatus that can obtain high-quality product water from seawater using a reverse osmosis method, and an operation control method of the multi-stage seawater desalination apparatus.

BACKGROUND ART

Conventional methods for obtaining fresh water from seawater include an evaporation method in which seawater is evaporated, and a reverse osmosis method in which fresh water is obtained by filtering seawater through a filtration membrane called a reverse osmosis membrane (RO membrane) by applying pressure to the seawater, concentrating the salt in the seawater, and discarding thereof.

The latter reverse osmosis method is energy efficient compared to the evaporation method. However, in the reverse osmosis method, a careful pretreatment (treatment with an "ultrafilter membrane (UF membrane)" or a "microfilter membrane (MF membrane)" for removing suspended matters in seawater, or raw water) is required to prevent the RO membrane from being clogged by microbes and deposits in seawater, and the maintenance and the like is expensive.

It is also difficult to obtain water quality as good as that produced by the evaporation method. To obtain highly purified water quality, a plurality of stages of reverse osmosis devices needs to be combined.

FIG. 10 is a schematic of a multi-stage seawater desalination apparatus of a conventional reverse osmosis method.

As shown in FIG. 10, a conventional multi-stage seawater desalination apparatus 100 includes a high-pressure pump $P_1$ that increases the pressure of raw water (seawater) 101 from which suspended matters are removed by pretreatment to a predetermined high pressure, a high-pressure reverse osmosis device 103 that includes a high-pressure reverse osmosis membrane 103a for concentrating a salt content in high-pressure feed water 102 whose pressure is increased by the high-pressure pump $P_1$, an intermediate tank 110 that temporarily stores therein permeated water 104 that has passed through the high-pressure reverse osmosis device 103, a low-pressure pump $P_2$ that reduces the pressure of the permeated water 104 supplied from the intermediate tank 110 to a predetermined low pressure, and a low-pressure reverse osmosis device 106 that has a low-pressure reverse osmosis membrane 106a for concentrating a salt content in low-pressure feed water 105 whose pressure is reduced by the low-pressure pump $P_2$, and obtains product water (fresh water) 107. Because the pressure in the intermediate tank 110 is returned to normal, the pressure is released. While the system is stopped, pH of the permeated water 104 is adjusted, by adding a pH adjusting agent 111, thereby preventing microbial contamination (see Non-Patent Document 1 "Fukuoka District Waterworks Agency: Mechanism of Seawater Desalination").

FIG. 10 is a schematic of concentrated water 103b from the high-pressure reverse osmosis device 103, and concentrated water 106b from the low-pressure reverse osmosis device 106.

[Non-Patent Document 1] "Fukuoka District Waterworks Agency: Mechanism of Seawater Desalination" URL:http://www.f-suiki.or.jp/seawater/facilities/mechanism.php

DISCLOSURE OF INVENTION

Problem to be Solved by the Invention

Conventionally, to combine the plurality of stages of reverse osmosis devices, as shown in FIG. 10, the operation is normally performed by placing the intermediate tank 110 between the devices. However, because the intermediate tank 110 is likely a cause of microbial contamination, the pH adjusting agent 111 needs to be added constantly.

At the start-up, the permeated water 104 to which the pH adjusting agent 111 is added needs to be discarded. This is a problem, because the conversion rate of the product water 107 is reduced as much as the amount being discarded.

Another problem is that the product water 107 cannot be supplied at the right timing of the system start-up, corresponding to the discard.

Accordingly, elimination of the intermediate tank 110 may be considered. When the plurality of stages is combined, the salt concentration of the concentrated water 106b at the subsequent stage (low-pressure reverse osmosis device 106) is lower than the salt concentration of the high-pressure feed water 102 at the preceding stage. Consequently, when a circulation operation in which the concentrated water 106b at the subsequent stage is returned to the side of the feed water at the preceding stage is performed, the salt concentration at the side of the high-pressure feed water 102 becomes low, thereby reducing the osmotic pressure, and reducing the operating pressure. As a result, when the reverse osmosis devices are directly connected without interposing the intermediate tank 110 therebetween, the pressure fluctuations at the start-up is large, thereby preventing a stable start-up operation.

In a combined system in which the high-pressure RO membrane 103a with chlorine-resistance is provided at the preceding stage and an RO membrane without chlorine-resistance is provided at the subsequent stage, it is difficult to carry out chlorination at the preceding stage, when the concentrated water 106b at the subsequent stage is returned to the side of the high-pressure feed water 102 at the preceding stage.

In isolated islands and desert regions where seawater desalination apparatuses are to be installed, a desalination technology that can stably supply a large amount of product water (2000 t/day to 5000 t/day) is required.

The water used in chemical plants and the like built in the desert regions may be required to have higher quality and less salt content (such as pure water whose salt concentration is equal to or less than 5 parts per million) than that of drinking water (salt concentration is equal to or less than 250 parts per million).

Accordingly, in the reverse osmosis method including a plurality of stages of RO membranes, a multi-stage seawater desalination apparatus that can obtain water quality as good as that produced by the evaporation method, that can prevent microbial contamination by eliminating the intermediate tank, and that enables serial start-up and operation has been much demanded.

The present invention is made in view of the above circumstances and intended to provide a multi-stage seawater desalination apparatus in series that can obtain high-quality product water from seawater using a reverse osmosis method and an operation control method of the multi-stage seawater desalination apparatus.

Means for Solving Problem

According to an aspect of the present invention, a multi-stage seawater desalination apparatus includes: a high-pressure pump that is mounted on a raw water line through which raw water is supplied, and increases pressure of the raw water to a predetermined high pressure; a high-pressure reverse osmosis device that includes a high-pressure reverse osmosis membrane for concentrating a salt content in high-pressure feed water whose pressure is increased by the high-pressure pump; a first drain valve that is mounted on a permeated water line through which permeated water that has passed through the high-pressure reverse osmosis device is supplied downstream, and temporarily drains the permeated water of an initial start-up; a low-pressure pump that is mounted on the permeated water line provided downstream of the first drain valve, and reduces pressure of the permeated water to a predetermined low pressure; a low-pressure reverse osmosis device that includes a low-pressure reverse osmosis membrane for concentrating a salt content in low-pressure feed water whose pressure is reduced by the low-pressure pump; and a second drain valve that is mounted on a discharge line on a concentrated water side of the low-pressure reverse osmosis device, and temporarily discharges the low-pressure feed water of the initial start-up supplied to the low-pressure reverse osmosis device.

Advantageously, the multi-stage seawater desalination apparatus further includes a plurality of the low-pressure reverse osmosis devices. The second drain valve is mounted on the discharge line at the concentrated water side of each of the low-pressure reverse osmosis devices, and temporarily discharges the low-pressure feed water of the initial start-up supplied to the low-pressure reverse osmosis devices.

Advantageously, the multi-stage seawater desalination apparatus further includes a returned concentrated water line that returns the concentrated water from the low-pressure reverse osmosis device upstream.

Advantageously, in the multi-stage seawater desalination apparatus, the high-pressure reverse osmosis device is a membrane with chlorine-resistance.

According to another aspect of the present invention, an operation control method of a multi-stage seawater desalination apparatus that uses the multi-stage seawater desalination apparatus described above, at an initial start-up of the multi-stage seawater desalination apparatus, includes: a step of supplying raw water to the high-pressure reverse osmosis device; a step of temporarily draining permeated water that has passed through the high-pressure reverse osmosis membrane of the high-pressure reverse osmosis device through the first drain valve; a step of supplying a whole amount of the permeated water to a side of the low-pressure reverse osmosis device, while closing the first drain valve, when a pressure of the permeated water has reached a pressure around an inlet pressure of the low-pressure pump; a step of temporarily draining low-pressure feed water of the initial start-up supplied to the low-pressure reverse osmosis device through the second drain valve; and a step of producing product water by making the low-pressure feed water pass through the low-pressure reverse osmosis membrane while closing the second drain valve, and switching operation to a rated seawater desalination operation.

According to still another aspect of the present invention, an operation control method of a multi-stage seawater desalination apparatus that uses the multi-stage seawater desalination apparatus described above, during a sterilization operation of the high-pressure reverse osmosis device of the multi-stage seawater desalination apparatus, includes: a step of supplying raw water to which chlorine (Cl) is added is supplied to the high-pressure reverse osmosis device without feeding a reducing agent from a first reducing agent supplying unit; a step of temporarily draining low-pressure feed water including a reducing agent through the second drain valve, after the reducing agent is added to permeated water with chlorine that has passed through the high-pressure reverse osmosis membrane of the high-pressure reverse osmosis device from a second reducing agent supplying unit; a step of switching operation to a normal operation, by adding a reducing agent from the first reducing agent supplying unit to the raw water, and stopping addition of the reducing agent from the second reducing agent supplying unit, after a predetermined sterilization operation is finished; and a step of producing product water, by switching operation to a rated seawater desalination operation, while closing the second drain valve.

Advantageously, in the operation control method of a multi-stage seawater desalination apparatus, concentrated water at a low pressure side is returned upstream through a returned concentrated water line, after the sterilization operation is finished.

According to still another aspect of the present invention, an operation control method of a multi-stage seawater desalination apparatus that uses the multi-stage seawater desalination apparatus described above, during a sterilization operation of the high-pressure reverse osmosis device of the multi-stage seawater desalination apparatus, includes: a step of supplying raw water to which chlorine (Cl) is added to the high-pressure reverse osmosis device without feeding a reducing agent from a first reducing agent supplying unit; a step of neutralizing permeated water with chlorine that has passed through the high-pressure reverse osmosis membrane of the high-pressure reverse osmosis device, by adding a reducing agent less than a neutralization equivalent from a second reducing agent supplying unit, and then supplying rest of the reducing agent for neutralizing to low-pressure feed water, while measuring an oxidation-reduction potential thereof with an oxidation-reduction potential meter; a step of producing product water by making the low-pressure feed water pass through the low-pressure reverse osmosis membrane; and a step of producing product water by switching operation to a rated seawater desalination operation, after the sterilization operation is finished.

Advantageously, in the operation control method of a multi-stage seawater desalination apparatus, concentrated water at a low pressure side is returned upstream through a returned concentrated water line during the sterilization operation and the rated operation.

Effect of the Invention

With the present invention, in a reverse osmosis method having a plurality of stages of RO membranes, it is possible to obtain water quality as good as that is produced by the evaporation method, prevent microbial contamination occurred when the system is stopped by eliminating the intermediate tank, and perform serial start-up and operation.

BRIEF DESCRIPTION OF DRAWINGS

FIG. 1 is a schematic of a multi-stage seawater desalination apparatus according to a first embodiment.

FIG. 2 is a process chart of the multi-stage seawater desalination apparatus according to the first embodiment.

FIG. 3A is an operational schematic of the multi-stage seawater desalination apparatus according to the first embodiment at Step 2.

FIG. 3B is an operational schematic of the multi-stage seawater desalination apparatus according to the first embodiment at Steps 3 and 4.

FIG. 3C is an operational schematic of the multi-stage seawater desalination apparatus according to the first embodiment at Step 5.

FIG. 4 is a schematic of a multi-stage seawater desalination apparatus according to a second embodiment.

FIG. 5 is a schematic of a multi-stage seawater desalination apparatus according to a third embodiment.

FIG. 6A is an operational schematic of the multi-stage seawater desalination apparatus according to the third embodiment at Steps 1 and 2.

FIG. 6B is an operational schematic of the multi-stage seawater desalination apparatus according to the third embodiment at Step 3.

FIG. 7 is a schematic of a multi-stage seawater desalination apparatus according to a fourth embodiment.

BEST MODE(S) FOR CARRYING OUT THE INVENTION

Figure 8:
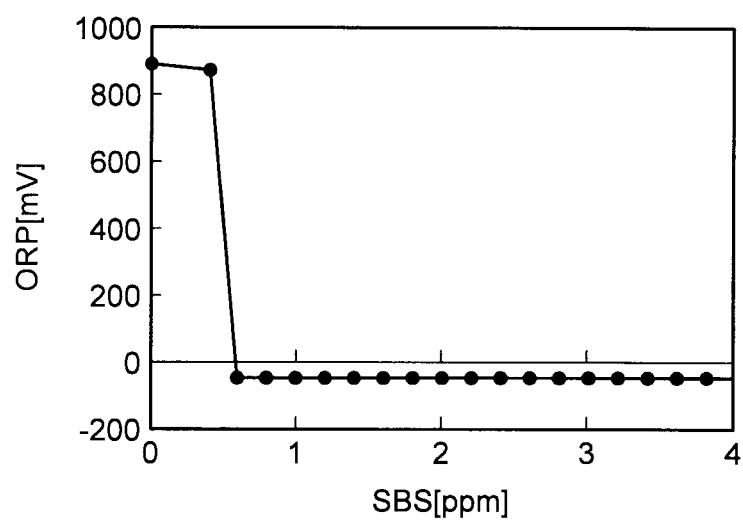
FIG. 8 is an illustration of variation of oxidation-reduction potential (ORP) when a reducing agent (SBS) is added.

Exemplary embodiments of the present invention will be described in detail with reference to the accompanying drawings. However, the present invention is not limited by the embodiments. Constituting elements in the embodiments include elements that can be easily conceived by those skilled in the art, or elements being substantially the same as those elements.

[First Embodiment]

A multi-stage seawater desalination apparatus according to a first embodiment of the present invention is described with reference to the accompanying drawings.

FIG. 1 is a schematic of the multi-stage seawater desalination apparatus according to the first embodiment.

As shown in FIG. 1, this multi-stage seawater desalination apparatus 10A according to the present embodiment includes a high-pressure pump $P_1$ that increases the pressure of raw water 11 to a predetermined high pressure and is mounted on a raw water line $L_1$ through which raw water (such as seawater) 11 is supplied, a high-pressure reverse osmosis device 13 that includes a high-pressure reverse osmosis membrane (high-pressure RO membrane) 13a for concentrating a salt content in high-pressure feed water 12 whose pressure is increased by the high-pressure pump $P_1$, a first drain valve 21 that temporarily drains permeated water 14 of the initial start-up through a discharge line $L_6$ and is mounted on a permeated water line $L_2$ through which the permeated water 14 that has passed through the high-pressure reverse osmosis device 13 is supplied downstream, a low-pressure pump $P_2$ that reduces the pressure of the permeated water 14 to a predetermined low pressure and is mounted on a permeated water line $L_3$ provided downstream of the first drain valve 21, a low-pressure reverse osmosis device 16 that has a low-pressure reverse osmosis membrane (low-pressure RO membrane) 16a for concentrating a salt content in low-pressure feed water 15 whose pressure is reduced by the low-pressure pump $P_2$, and a second drain valve 22 that temporarily discharges the low-pressure feed water 15 of the initial start-up supplied to the low-pressure reverse osmosis device 16 and is mounted on a discharge line $L_5$ at the concentrated water side of the low-pressure reverse osmosis device 16.

To filter the raw water 11, the pretreatment may be carried out by using an ultrafilter membrane (UF membrane), a microfilter membrane (MF membrane), or the like, that removes suspended matters in seawater, similar to the conventional manner.

In FIG. 1, the reference numeral 13b denotes concentrated water from the high-pressure reverse osmosis device 13, the reference numeral 16b denotes concentrated water from the low-pressure reverse osmosis device 16, and the reference numeral 18 denotes a switch valve that switches the flow path of product water 17a having a value equal to or less than a defined value and is mounted on a product water line $L_7$.

In the present embodiment, a three-way valve is used for the first and the second drain valves 21 and 22. However, the present invention is not limited thereto.

To start the system by using the multi-stage seawater desalination apparatus 10A, the system is started by the following procedure.

FIG. 2 is the process chart.

<Step 1> At Step 1, at the initial start-up of the system, the raw water 11 is supplied to the high-pressure reverse osmosis device 13 through the high-pressure pump $P_1$ (S-1). At this time, the concentrated water 13b is discharged outside through a concentrated water line $L_4$.

<Step 2> At Step 2, the permeated water 14 that has passed through the high-pressure reverse osmosis membrane 13a of the high-pressure reverse osmosis device 13 is temporarily drained from the discharge line $L_6$ through the first drain valve 21 (S-2: see FIG. 3A).

<Step 3> At Step 3, when the pressure of the permeated water 14 that passed through the first drain valve 21 has reached the pressure around the inlet pressure of the low-pressure pump $P_2$, the whole amount of the permeated water 14 having a predetermined pressure is supplied to the side of the low-pressure reverse osmosis device 16 through the low-pressure pump $P_2$, while closing the first drain valve 21 (S-3: see FIG. 3B).

<Step 4> At Step 4, the low-pressure feed water 15 of the initial start-up supplied to the low-pressure reverse osmosis device 16 is temporarily drained through the second drain valve 22 (S-4: see FIG. 3B).

<Step 5> At Step 5, when the pressure of the low-pressure feed water 15 has reached a predetermined permeate pressure of the low-pressure RO membrane 16a of the low-pressure reverse osmosis device 16, the low-pressure feed water 15 is passed through the low-pressure reverse osmosis membrane 16a, while closing the second drain valve 22. By switching operation to the rated seawater desalination operation, product water 17 is produced (S-5: see FIG. 3C).

In this manner, when the plurality of stages (two-stage in the present embodiment) of RO device is connected directly, the permeated water 14 is drained through the first drain valve 21, and waits until the pressure of the permeated water 14 reaches a predetermined pressure at the inlet pressure of the low-pressure pump $P_2$. When it is confirmed that the pressure of the permeated water 14 has reached the pressure around the inlet pressure of the low-pressure pump $P_2$, the whole amount of the low-pressure feed water 15 is supplied to the side of the low-pressure reverse osmosis device 16, while closing the first drain valve 21.

The low-pressure feed water 15 of the initial start-up supplied to the low-pressure reverse osmosis device 16 is then temporarily drained through the second drain valve 22, and waits until the pressure of the low-pressure feed water 15 reaches the permeate pressure of the low-pressure RO membrane 16a of the low-pressure reverse osmosis device 16.

When it is confirmed that the pressure of the low-pressure feed water 15 has reached near the permeate pressure of the low-pressure RO membrane 16a of the low-pressure reverse osmosis device 16, the low-pressure feed water 15 is passed through the low-pressure reverse osmosis membrane 16a, while closing the second drain valve 22. By switching operation to the rated seawater desalination operation, the product water 17 is produced.

Accordingly, even if the conventional intermediate tank is not installed, it is possible to prevent the pressure fluctuations at the initial start-up, and constantly perform start-up operation in a stable manner.

[Second Embodiment]

FIG. 4 is a schematic of a multi-stage seawater desalination apparatus according to a second embodiment. The same reference numerals are given to the same elements as those in the multi-stage seawater desalination apparatus in FIG. 1, and their repeated descriptions will be omitted.

As shown in FIG. 4, this multi-stage seawater desalination apparatus 10B according to the present embodiment returns the concentrated water 16b concentrated by the low-pressure reverse osmosis device 16 in the multi-stage seawater desalination apparatus 10A according to the first embodiment to the raw water line $L_1$ through a returned concentrated water line $L_8$.

Accordingly, product water can be obtained again by reconcentrating those discarded as the concentrated water, thereby reducing the amount of discarded concentrated water and increasing the amount of product water.

To start the system by using the multi-stage seawater desalination apparatus 10B, the system is started by the following procedure.

<Step 1> At Step 1, at the initial start-up of the system, the raw water 11 is supplied to the high-pressure reverse osmosis device 13 through the high-pressure pump $P_1$. At this time, the concentrated water 13b is discharged outside through the concentrated water line $L_4$. Because the pressure of the concentrated water 13b is high, the energy is collected by driving a turbine T.

<Step 2> At Step 2, the permeated water 14 that has passed through the high-pressure reverse osmosis membrane 13a of the high-pressure reverse osmosis device 13 is temporarily drained from the discharge line $L_6$ through the first drain valve 21.

<Step 3> At Step 3, when the pressure of the permeated water 14 has reached the pressure around the inlet pressure of the low-pressure pump $P_2$, the whole amount of the permeated water 14 is supplied to the side of the low-pressure reverse osmosis device 16 through the low-pressure pump $P_2$, while closing the first drain valve 21.

<Step 4> At Step 4, the low-pressure feed water 15 of the initial start-up supplied to the low-pressure reverse osmosis device 16 is temporarily drained through the second drain valve 22.

<Step 5> At Step 5, when the pressure of the low-pressure feed water 15 has reached the permeate pressure of the low-pressure RO membrane 16a of the low-pressure reverse osmosis device 16, the low-pressure feed water 15 is passed through the low-pressure reverse osmosis membrane 16a, while closing the second drain valve 22. By switching operation to the rated seawater desalination operation, the product water 17 is produced <Step 6> At Step 6, after a predetermined rated concentration operation is carried out in the low-pressure reverse osmosis device 16, the concentrated water 16b is returned to the raw water line $L_1$ through the returned concentrated water line $L_8$, as returned concentrated water 26, while adjusting a flowmeter FC and a switching valve 25.

Accordingly, because the concentrated water is not simply returned as the returned concentrated water 26, the concentrated water 16b can be returned to the side of the raw water 11 from the low-pressure reverse osmosis device 16 at the subsequent stage. Consequently, it is possible to prevent the reduction of the operating pressure, due to the reduced osmotic pressure.

With the first and the second embodiments, it is possible to provide water quality as good as that is produced by the evaporation method, and because the intermediate tank is eliminated, it is possible to significantly reduce microbial contamination.

[Third Embodiment]

FIG. 5 is a schematic of a multi-stage seawater desalination apparatus according to a third embodiment. The same reference numerals are given to the same elements as those in the multi-stage seawater desalination apparatuses in FIGS. 1 and 4, and their repeated descriptions will be omitted.

As shown in FIG. 5, this multi-stage seawater desalination apparatus 10C according to the present embodiment disposes the high-pressure RO membrane 13a with chlorine-resistance in the high-pressure reverse osmosis device 13, and disposes the low-pressure RO membrane 16a without chlorine-resistance in the low-pressure reverse osmosis device 16, in the multi-stage seawater desalination apparatus 10B according to the second embodiment. After a predetermined period of operation, addition of a reducing agent 32 that neutralizes the chlorine in the raw water 11 is stopped, and sterilization is carried out for a predetermined period of time, by using the chlorine in the raw water. Accordingly, high-quality product water can be obtained in a stable manner.

In the present embodiment, a cellulose acetate membrane is used as the high-pressure RO membrane 13a with chlorine-resistance. A polyamide membrane is used as the low-pressure RO membrane 16a without chlorine-resistance.

As shown in FIG. 5, during a normal operation, the reducing agent 32 is supplied to the raw water line $L_1$ from a first reducing agent supplying unit 31-1, to neutralize chlorine.

In this case, the reducing agent 32 is not supplied to the permeated water line $L_2$ from a second reducing agent supplying unit 31-2.

SBS may be used as the reducing agent 32. However, the present invention is not limited thereto.

At the initial operation, the operation is started as the first embodiment, and the rated operation is being continued.

A first sterilization operation mode to carry out sterilization treatment will now be explained.

FIGS. 6A and 6B are the sterilization operation mode (first mode).

As shown in FIG. 6A, at Step 1, raw water $11_{Cl}$ to which chlorine (Cl) is added, is supplied to the high-pressure reverse osmosis device 13, without feeding the reducing agent 32 from the first reducing agent supplying unit 31-1 (Step 1).

At Step 2, permeated water $14_{Cl}$ with chlorine that has passed through the high-pressure reverse osmosis membrane 13a of the high-pressure reverse osmosis device 13 is neutralized by adding the reducing agent (SBS) 32 from the second reducing agent supplying unit 31-2. The permeated water 14 is then passed through the low-pressure RO membrane 16a of the low-pressure reverse osmosis device 16, and low-pressure feed water $15_{SBS}$ with the reducing agent (SBS) 32 is temporarily drained through the second drain valve 22 (Step 2). At Step 2, the low-pressure feed water $15_{SBS}$ includes the reducing agent. Accordingly, the low-pressure feed water $15_{SBS}$ is stopped from being returned to the side of the raw water 11 through the returned concentrated water line $L_8$, by switching the switching valve 25. This is to prevent the reducing agent from being supplied to the raw water, and interfering with the sterilization operation.

As shown in FIG. 6B, at Step 3, after a predetermined sterilization is being operated, the reducing agent 32 is added to the raw water $11_{Cl}$ from the first reducing agent supplying unit 31-1, and the addition of the reducing agent 32 from the second reducing agent supplying unit 31-2 is stopped, thereby switching operation to a normal operation (Step 3).

At Step 4, while closing the second drain valve 22, the product water 17 is produced, by switching operation to the rated seawater desalination operation (Step 4).

The low-pressure reverse osmosis device 16 is interposed between oxidation-reduction potential (ORP) meters 41-1 and 41-2, and the oxidation-reduction potential of the low-pressure feed water 15 is measured thereby.

The period of time for the sterilization treatment may be modified suitably according to the equipment and the operation load. As an example, after six hours to ten hours of operation, chlorination sterilization is carried out for about an hour.

After the sterilization is complete, the concentrated water at the low-pressure side is returned upstream through the returned concentrated water line $L_8$ as the returned concentrated water 26.

In this manner, by chlorination sterilizing every time the apparatus is operated for a predetermined period of time, it is possible to sterilize the membranes, and to constantly produce clean product water equal to or higher than a certain level of quality.

[Fourth Embodiment]

FIG. 7 is a schematic of a multi-stage seawater desalination apparatus according to a fourth embodiment. The same reference numerals are given to the same elements as those in the multi-stage seawater desalination apparatus in FIG. 5, and their repeated descriptions will be omitted.

The present embodiment is a second sterilization operation mode to carry out sterilization treatment.

FIG. 7 is the sterilization operation mode (second mode). As shown in FIG. 7, this multi-stage seawater desalination apparatus 10D according to the present embodiment operates the oxidation-reduction potential (ORP) meter in the multi-stage seawater desalination apparatus 10C according to the third embodiment, and produces product water also during the sterilization treatment.

As shown in FIG. 7, the following steps are executed during the sterilization operation of the high-pressure reverse osmosis device of the multi-stage seawater desalination apparatus.

At Step 1, the raw water $11_{Cl}$ to which chlorine (Cl) is added is supplied to the high-pressure reverse osmosis device 13, without feeding the reducing agent 32 from the first reducing agent supplying unit 31-1 (Step 1).

At Step 2, the reducing agent (SBS) 32 less than the neutralization equivalent is added to the permeated water $14_{Cl}$ with chlorine that has passed through the high-pressure reverse osmosis membrane 13a of the high-pressure reverse osmosis device 13, from the second reducing agent supplying unit 31-2. The rest of reducing agent 32 for neutralizing is then supplied to the low-pressure feed water 15 from a third reducing agent supplying unit 31-3, while measuring the oxidation-reduction potential with the oxidation-reduction potential (ORP) meter 41-1 (Step 2).

The reasons for taking such measures are as follows:

To remove chlorine in the permeated water $14_{Cl}$ of the high-pressure reverse osmosis device 13, the reducing agent 32 is supplied in excess by the first reducing agent supplying unit 31-1, from the safety point of view.

The ORP meter 41-1 indicates a large value, when chlorine is present. However, it is difficult to determine the supplied amount of reducing agent, after the chlorine is removed.

FIG. 8 illustrates the variation of ORP when a reducing agent (SBS) is added to the water with a chlorine concentration of 0.3 parts per million at the exit.

As shown in FIG. 8, the ORP value is high when a large amount of chlorine is present. The ORP value is low, if chlorine is not present (minus).

Accordingly, when the chlorine has been consumed, the measurement of the concentration of reducing agent is difficult, even if the reducing agent is supplied in excess. The is because, when the product water 17 is produced while a large amount of reducing agent 32 is supplied, the produced product water 17 includes a large amount of reducing agent, compared to the product water produced during the normal operation. To prevent this from happening, in the third embodiment, the low-pressure feed water $15_{SBS}$ with reducing agent is drained through the second drain valve 22 (Step 2 of the third embodiment: see FIG. 6A).

Alternatively, in the present embodiment, the supply of the reducing agent is monitored with the oxidation-reduction potential meter 41-1, and the value is controlled within a high sensitivity area (at this time, 200 millivolts to 400 millivolts). A certain amount (at this time, approximately 1 part per million) of the reducing agent 32 is then supplied by the third reducing agent supplying unit 31-3 including a metering pump. Accordingly, the chlorine can be completely removed, and the reducing agent can be prevented from being oversupplied.

In this manner, the supply of the reducing agent can be suitably managed, and the product water with an extremely low amount of reducing agent can also be produced during the sterilization operation.

[Fifth Embodiment]

Figure 9:
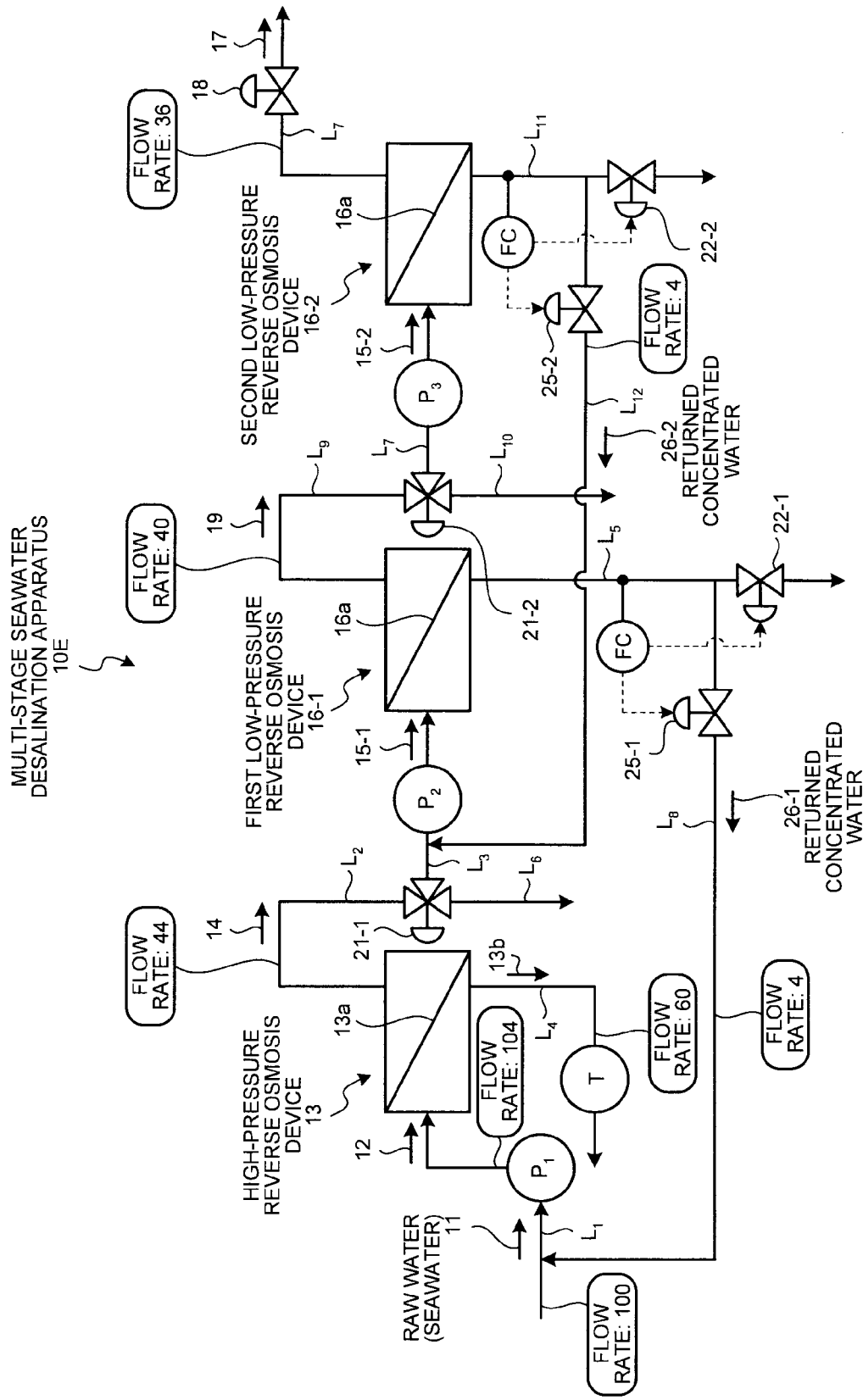
FIG. 9 is a schematic of a multi-stage seawater desalination apparatus according to a fifth embodiment.
Figure 10:
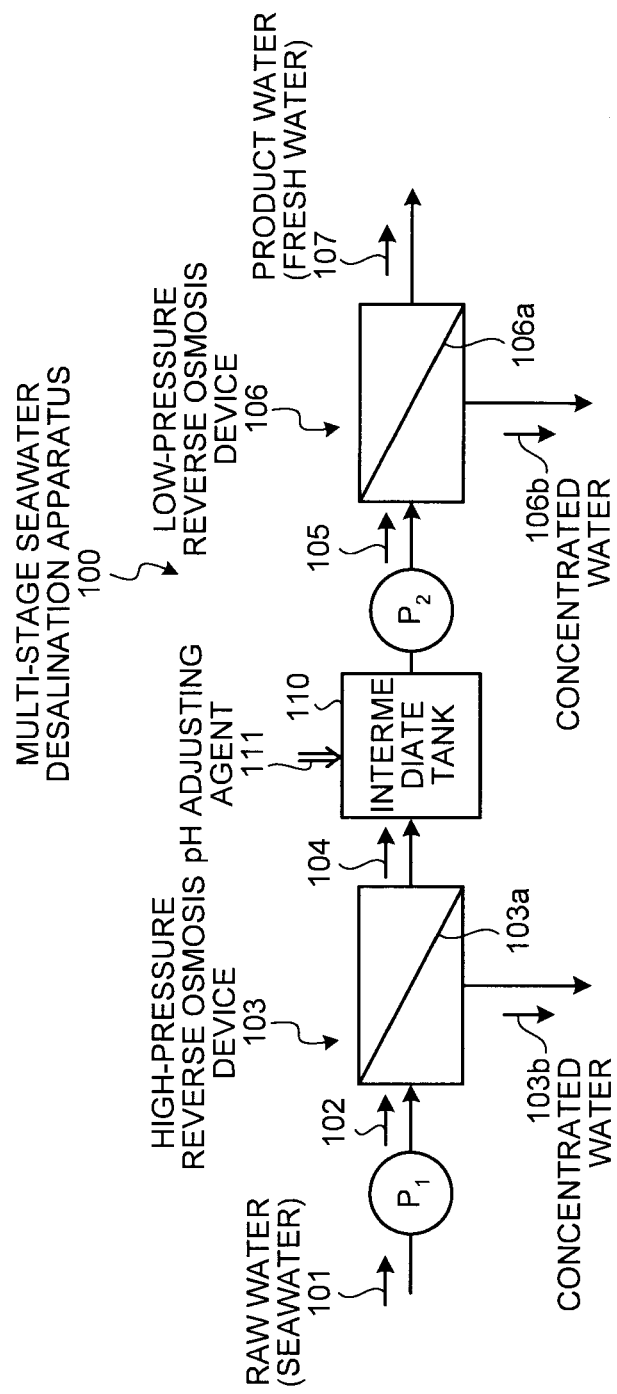
FIG. 10 is a schematic of a multi-stage seawater desalination apparatus according to a conventional example.

FIG. 9 is a schematic of a multi-stage seawater desalination apparatus according to a fifth embodiment. The same reference numerals are given to the same elements as those in the multi-stage seawater desalination apparatus in FIG. 1, and their repeated descriptions will be omitted. As shown in FIG. 9, this multi-stage seawater desalination apparatus 10E according to the present embodiment includes two stages of the low-pressure reverse osmosis device 16 (low-pressure reverse osmosis device 16-1 and low-pressure reverse osmosis device 16-2) in the multi-stage seawater desalination apparatus 10A according to the first embodiment.

The concentrated water concentrated by the first low-pressure reverse osmosis device 16-1 is returned to the raw water line $L_1$ through the returned line $L_8$ as returned concentrated water 26-1, and the concentrated water concentrated by the second low-pressure reverse osmosis device 16-2 is returned to the permeated water line $L_3$ through a returned concentrated water line $L_{12}$ as returned concentrated water 26-2.

In FIGS. 9, 15-1 and 15-2 denote low-pressure feed water, 21-1 and 21-2 denote first drain valves, 22-1 and 22-2 denote second drain valves, 25-1 and 25-2 denote switching valves, $L_9$ denotes a low-pressure water transmission line, $L_{10}$ denotes a discharge line, and $L_{11}$ denotes a discharge line.

At the initial start-up of the system, the first low-pressure reverse osmosis device 16-1 is operated, and when a predetermined pressure is reached, the low-pressure feed water 15-2 is supplied to the second low-pressure reverse osmosis device 16-2, while draining the low-pressure feed water 15-1 through the first drain valve 21-1. When a predetermined pressure is reached at the first drain valve 21-2, the product water 17 is produced by the second low-pressure reverse osmosis device 16-2.

In the present embodiment, if the flow rate of the raw water 11 is "100", the raw water 11 with the flow rate of "104" is supplied to the high-pressure reverse osmosis device 13, because the returned concentrated water 26-1 is returned.

The permeated water 14 with the flow rate of "44" passes through the high-pressure RO membrane 13a of the high-pressure reverse osmosis device 13, and the concentrated water 13b with the flow rate of "60" is supplied to the side of the turbine T as high-pressure discharge water, where the energy is collected.

Permeated water 19 with the flow rate of "40" passes through the low-pressure RO membrane 16a of the first low-pressure reverse osmosis device 16-1, and the concentrated water with the flow rate of "4" is returned to the raw water 11 as the returned concentrated water 26-1 as discharge water, and is reused.

The product water 17 with the flow rate of "36" passes through the low-pressure RO membrane 16a of the second low-pressure reverse osmosis device 16-2, and the concentrated water with the flow rate of "4" is returned to the permeated water 14 as the returned concentrated water 26-2 as discharge water, and is reused.

While the sterilization treatment is carried out, the high-quality product water is constantly manufactured by executing either the third or the fourth embodiment.

In this manner, with the fifth embodiment, the low-pressure reverse osmosis device has a plurality of stages. Accordingly, when the concentration of salt in the raw water 11 is 220,000 parts per million, the high-pressure reverse osmosis device 13 can reduce the concentration of salt to 500 parts per million, the first low-pressure reverse osmosis device 16-1 can reduce the concentration of salt to approximately 100 parts per million, and the second low-pressure reverse osmosis device 16-2 can reduce the concentration of salt to equal to or less than 5 parts per million. Accordingly, pure water equal to or more than drinking water (approximately 250 parts per million) can be manufactured in a stable manner.

Because a part of the concentrated water is reused, it is also possible to reduce the discharge of concentrated water and increase the amount of product water being produced.

Industrial Applicability

In this manner, with the operation control method of the multi-stage seawater desalination apparatus according to the present invention, it is possible to provide water quality as good as that is produced by the evaporation method. Because the intermediate tank is eliminated, it is possible to significantly reduce microbial contamination. Accordingly, it can be suitably used for seawater desalination equipment.

EXPLANATIONS OF LETTERS OR NUMERALS

10A, 10B, 100, 10D, and 10E multi-stage seawater desalination apparatus
11 raw water (such as seawater)
12 high-pressure feed water
13a high-pressure reverse osmosis membrane
13 high-pressure reverse osmosis device
14 permeated water
15 low-pressure feed water
16a low-pressure reverse osmosis membrane
16 low-pressure reverse osmosis device
17 product water
21 first drain valve
22 second drain valve

The invention claimed is:

1. An operation control method of a multi-stage seawater desalination apparatus that uses a multi-stage seawater desalination apparatus, during a sterilization operation of the high-pressure reverse osmosis device of the multi-stage seawater desalination apparatus, the multi-stage seawater desalination apparatus comprising:
a high-pressure pump that is mounted on a raw water line through which raw water is supplied, and increases pressure of the raw water to a predetermined high pressure;
a high-pressure reverse osmosis device that includes a high-pressure reverse osmosis membrane for concentrating a salt content in high-pressure feed water whose pressure is increased by the high-pressure pump;
a first drain valve that is mounted on a permeated water line through which permeated water that has passed through the high-pressure reverse osmosis device is supplied downstream, and temporarily drains the permeated water of an initial start-up;
a low-pressure pump that is mounted on the permeated water line provided downstream of the first drain valve, and reduces pressure of the permeated water to a predetermined low pressure;
a low-pressure reverse osmosis device that includes a low-pressure reverse osmosis membrane for concentrating a salt content in low-pressure feed water whose pressure is reduced by the low-pressure pump; and
a second drain valve that is mounted on a discharge line on a concentrated water side of the low-pressure reverse osmosis device, and temporarily discharges the low-pressure feed water of the initial start-up supplied to the low-pressure reverse osmosis device;
wherein the high-pressure reverse osmosis device is a membrane with chlorine-resistance;
the operation control method comprising:
a step of supplying raw water to which chlorine (Cl) is added is supplied to the high-pressure reverse osmosis device without feeding a reducing agent from a first reducing agent supplying unit;
a step of temporarily draining low-pressure feed water including a reducing agent through the second drain valve, after the reducing agent is added to permeated water with chlorine that has passed through the high-pressure reverse osmosis membrane of the high-pressure reverse osmosis device from a second reducing agent supplying unit;
a step of switching operation to a normal operation, by adding a reducing agent from the first reducing agent supplying unit to the raw water, and stopping addition of the reducing agent from the second reducing agent supplying unit, after a predetermined sterilization operation is finished; and
a step of producing product water, by switching operation to a rated seawater desalination operation, while closing the second drain valve.

2. The operation control method of a multi-stage seawater desalination apparatus according to claim 1, wherein concentrated water at a low pressure side is returned upstream through a returned concentrated water line, after the sterilization operation is finished.

3. An operation control method of a multi-stage seawater desalination apparatus that uses a multi-stage seawater desalination apparatus, during a sterilization operation of the high-pressure reverse osmosis device of the multi-stage seawater desalination apparatus, the multi-stage seawater desalination apparatus comprising:

a high-pressure pump that is mounted on a raw water line through which raw water is supplied, and increase pressure of the raw water to a predetermined high pressure;

a high-pressure reverse osmosis device that includes a high-pressure reverse osmosis membrane for concentrating a salt content in high-pressure feed water whose pressure is increased by the high-pressure pump;

a first drain valve that is mounted on a permeated water line through which permeated water that has passed through the high-pressure reverse osmosis device is supplied downstream, and temporarily drains the permeated water of an initial start-up;

a low-pressure pump that is mounted on the permeated water line provided downstream of the first drain valve, and reduces pressure of the permeated water to a predetermined low pressure;

a low-pressure reverse osmosis device that includes a low-pressure reverse osmosis membrane for concentrating a salt content in low-pressure feed water whose pressure is reduced by the low-pressure pump; and a second drain valve that is mounted on a discharge line on a concentrated water side of the low-pressure reverse osmosis device, and temporarily discharges the low-pressure feed water of the initial start-up supplied to the low-pressure reverse osmosis device;

an oxidation-reduction potential (ORP) meter provided between the low-pressure pump and the low-pressure reverse osmosis device, for measuring an oxidation-reduction potential of the low-pressure feed water;

a first reducing agent supplying unit provided upstream of the high-pressure pump, for supplying a first reducing agent to the raw water line;

a second reducing agent supplying unit provided upstream of the first drain valve, for supplying a second reducing agent to the permeated water line; and a third reducing agent supplying unit for supplying a third reducing agent to the low-pressure feed water, wherein the high-pressure reverse osmosis device is a membrane with chlorine-resistance, the operation control method comprising:

a step of supplying raw water to which chlorine (Cl) is added to the high-pressure reverse osmosis device without feeding the first reducing agent from the first reducing agent supplying unit;

a step of neutralizing permeated water with chlorine that has passed through the high-pressure reverse osmosis membrane of the high-pressure reverse osmosis device, by adding the second reducing agent less than a neutralization equivalent from the second reducing agent supplying unit, and then supplying the third reducing agent as rest of the reducing agent for neutralizing from the third reducing agent supplying unit to the low-pressure feed water, while measuring an oxidation-reduction potential thereof with the oxidation-reduction potential meter;

a step of producing product water by making the low-pressure feed water pass through the low-pressure reverse osmosis membrane; and a step of producing product water by switching operation to a rated seawater desalination operation, after the sterilization operation is finished.

4. The operation control method of a multi-stage seawater desalination apparatus according to claim 3, wherein concentrated water at a low pressure side is returned upstream through a returned concentrated water line during the sterilization operation and the rated operation.

* * * * *